Oct. 6, 1970    J. BEERY ET AL    3,532,402

BEARING MOUNT

Filed May 9, 1968

INVENTORS.
JACK BEERY.
WILLIAM B. TEMPLETON.
BY
*Russel C. Wells.*
ATTORNEY.

United States Patent Office 3,532,402
Patented Oct. 6, 1970

3,532,402
BEARING MOUNT
Jack Beery, Farmington, and William B. Templeton, Howell, Mich., assignors to Burroughs Corporation, Detroit, Mich., a corporation of Michigan
Filed May 9, 1968, Ser. No. 728,017
Int. Cl. F16c 35/06
U.S. Cl. 308—236                            1 Claim

ABSTRACT OF THE DISCLOSURE

A mounting located in a stationary side frame for supporting a rotating shaft which is journaled in a ball bearing. The mount is a cup-shaped member having a plurality of equally and angularly spaced displaceable lands extending longitudinally along the inside surface thereof. The outer ring of the bearing is retained within the mount because of the radial forces exerted thereon by the displaced lands.

PRIOR ART

The use of bearings to locate and support rotating members requires that the several surfaces in contact with the bearing be dimensioned and finished within a very small tolerance range. With a small tolerance range on both dimensioning and surface finishing, the cost of manufacturing and fabricating rotating assemblies is great. Often times, the mounting holes for bearings are fabricated in a boring operation in order to achieve the high degree of accuracy required. The bearing is then pressed into the housing and the resultant interference fit holds the outer ring of the bearing in place. If the environment of this bearing assembly does not change, the designed fit will generally remain. But, if the environment of this bearing assembly is cycled through a relatively small temperature range, the expansion and contraction of the housing may differ from that of the bearing and the designed fit will then be lost. Such an application occurs wherein a steel bearing is mounted in an aluminum housing. The thermal coefficient of expansion of aluminum is approximately twice that of steel, therefore, when the environment of the bearing assembly is cycled through a relatively small temperature range the housing expands faster than the steel causing the designed interference fit to be lost. To overcome this problem, the bearings have been bonded into place to the designed fit. Also, steel sleeves have been assembled around the outside ring of the bearing to reduce the variation in fit due to temperature changes.

It is, therefore, the principal object of the invention to provide a mounting for a bearing which will maintain the desired mounting forces over a wide temperature range.

Another object of the invention is to provide a simple and efficient means for mounting steel bearings in aluminum housings.

A further object is to reduce the manufacturing cost of bearing mounts.

SUMMARY OF THE INVENTION

A bearing mount comprising a tubular shaped body and having a plurality of equally and angularly spaced lands extending longitudinally along the inside surface of the body. The lands are of a resilient material which are displaced in a radial direction when supporting a bearing therebetween. The radially directed forces stored in the resilient lands act to hold the bearing against axial movement.

DETAILED DESCRIPTION

Figure 5:
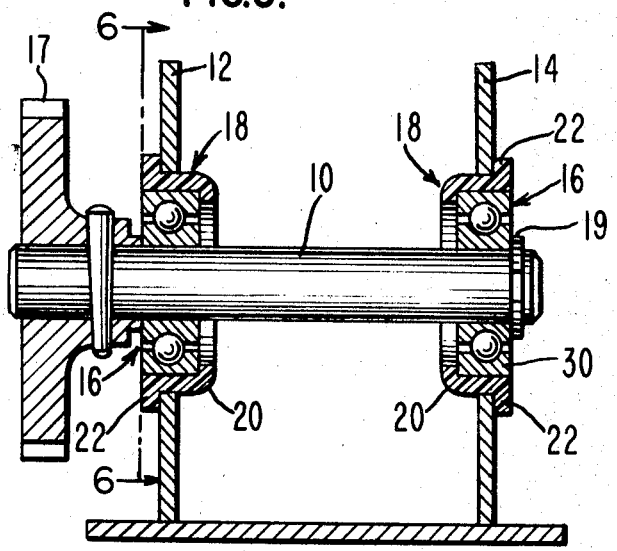
FIG. 5 is a cross sectional view showing an assembly of a bearing and mount therefor.

Referring to FIG. 5 there is shown a rotating shaft 10 which is journaled in a pair of opposed side frames 12 and 14 by bearings 16 located in a pair of bearing mounts 18. The shaft 10 is contained within the bearing mountings 18 by a pulley 17 or wheel on one end and a clip 19 or fastener on the opposite end. The bearing mount 18, which is further illustrated in FIG. 3, comprises a housing 20 or noise suppressor, preferably a continuous tubular member, having an external flange 22 at one end thereof, a plurality of equally and angularly spaced lands 24 along the inside surface of the tubular member 20 and an internal flange or thrust member 26 at the opposite end.

Figure 3:
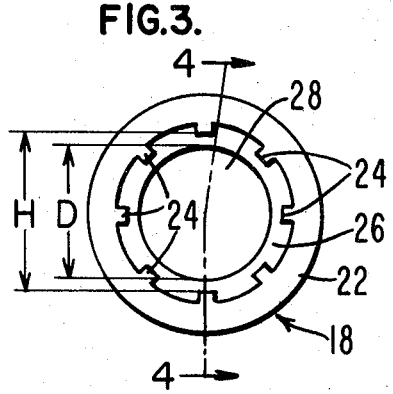
FIG. 3 is a plan view of the preferred embodiment of a bearing mount.
Figure 4:
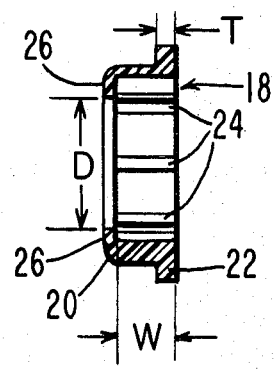
FIG. 4 is a sectional view taken along the line 4—4 of FIG. 3.

As shown in FIG. 3, the internal flange 26 has a width of axial length substantially less than the length of the tubular member. The inner edge of the flange 26 defines an aperture 28 which is concentric about the longitudinal axis of the tubular member 20. The function of this internal flange 26 is to provide a support to locate and shoulder the outer ring or race 30 of the bearing 16. The diameter D of the aperture 28 corresponds to the recommended housing shoulder diameter for a given bearing size as found in bearing handbooks. The depth W of the bearing mount 18 is equal to or greater than the width of the bearing 16. The external flange 22 which has width T or axial length substantially less than the length of the tubular member 20 is for locating and holding the bearing mount 18 in the side frame 12 or 14. The internal lands 24, which are equally and angularly spaced about the inner surface of the tubular member 20 extend longitudinally from the inner flange 26 to the opposite end. The inside diameter H of the lands 24 is less than the outside diameter of the bearing 16, thereby providing a press or interference fit between the outer ring 30 of the bearing 16 and the lands 24. The total surface area of the lands 24 determines the amount of force which is necessary to apply to the outer ring 30 of the bearing 16 when assembling the bearing in the mount 18.

Figure 7:
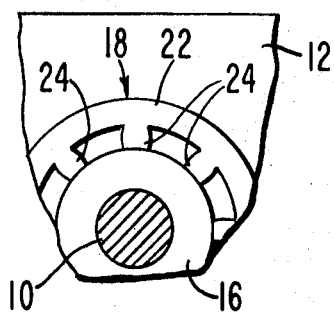
FIG. 7 is an enlarged fragmentary view partly in section of FIG. 6.
Figure 6:
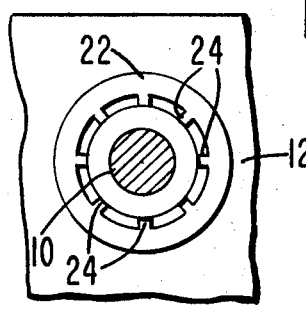
FIG. 6 is a sectional view partly in elevation taken along line 6—6 of FIG. 5.

In assembling the rotating shaft 10 shown in FIG. 5, the bearing mounts 18 are first inserted in each side frame 12 and 14. The mounting hole in the side frame can be inexpensively fabricated such as by drilling or reaming. The tolerance on the hole diameter is not critical. The outside diameter of the tubular member 20 is larger than the diameter of the mounting hole thereby causing an interference fit but with the use of a material having a low coefficient of friction the insertion force is relatively small. The external flange 22 is fitted against the surface of the side frame 12 and 14 thereby controlling the position of the bearing amount 18 relative to the side frame. The bearing 16 is positioned on the shaft 10 and then the bearing is pressed into the bearing mount 18 as shown in FIG. 6. The diameter H across the surface of the lands 24 is smaller than the outside diameter of the bearing 16 thereby causing an interference fit between the bearing and the bearing mount 18. When the bearing is inserted into the bearing mount, the lands 24 are displaced and compressed as shown in FIG. 7 thereby exerting a radial force against the outside ring 30 of the bearing. The number and also the surface area of the lands 24 determine the amount of force required to seat the bearing against the inner flange 26 of the bearing mount and the height of the lands 24 determine the amount of radial force applied to the bearing. By using Delrin AF, the coeffcient of friction between the outside bearing ring 30 and the lands 24 is small thereby requiring an insertion force which can be applied by hand without the use of an arbor press or similar equipment. As mentioned previously, the inner flange 26 provides a shoulder to locate and support the outer ring 30 of the bearing. Also, the low coefficient of friction between the outer ring 30 and the lands 24 also permits the outer ring to rotate very slowly, on the order of one revolution per day depending on shaft speeds and loads, thereby presenting a new loading point to the bearing and reducing bearing fatigue.

Figure 1:
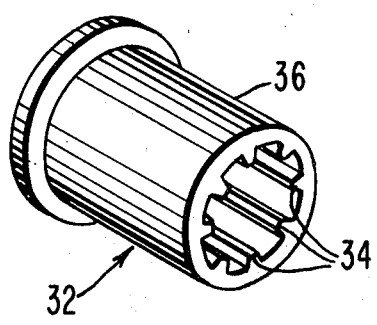
FIG. 1 is a perspective view of one modification of a bearing mount embodying features of the invention.

In FIG. 1 there is illustrated a modification 32 of the bearing mount 18 in FIG. 3. This modification does not have the internal flange whereby the internal lands 34 can extend the length of the tubular member 36. Using this modification, the housing shoulder required for the bearing may be provided by various means external to the mount 32, such as counterboring the aperture in the housing and abutting the outer ring of the bearing against the bottom of the counterbored aperture.

Figure 2:
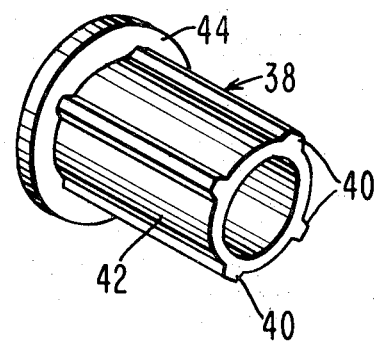
FIG. 2 is a perspective view of another modification of a bearing mount.

In FIG. 2, there is shown still another modification 38 of the bearing mount 18. In this modification, the equally and angularly spaced lands 40 are on the external surface of the tubular member 42, whereby the bearing mount 38 is inserted into the bore diameter of the bearing and the tubular member 42 is mounted on the shaft. The diameter of the external flange 44 corresponds to the shaft shoulder diameter for a given bearing as recommended in bearing handbooks. It is to be understood that an internal flange could be supplied in this modification wherein the bearing mount would then be positioned as a cap on one end of a shaft. In such an application, the internal flange could be used to locate the mount on the shaft.

The bearing mounts 18, 32, or 38 according to our invention, can be fabricated in many ways. In particular, the mount can be molded using a plastic type of material such as Delrin. In particular, we have used Derlin AF, a plastic material having an amount of Teflon therein to reduce the coefficient of friction of the material. The mold to be used is generally a two-part mold wherein the die or stationary part of the mold corresponds to the outside periphery of the mount and the ram or moveable part of the mold has the pattern of the lands and determines the size of the aperture and internal flange.

A predetermined amount of liquid Delrin AF heated to a temperature of 380° F. is injected into a mold in which the die is heated to 175° F. and the ram is heated to 160° F. A pressure of 1000 p.s.i. is then applied to the Delrin AF for a time period of 30 seconds causing the Delrin AF to take the shape of the mold. The mold is then cooled causing the Delrin AF to solidify. When the Delrin AF is solidified, the bearing mount is ejected from the mold. The total cycle time is 40 seconds.

While we have used Delrin AF as a material in the preferred embodiment, the bearing mounts 18, 32, or 38 can be fabricated from any type of displaceable material such as various metals, rubbers or other plastics. The use of Delrin AF permitted the mount to be molded in a relatively inexpensive mold and also the low coefficient of friction of the material permitted a relatively small insertion force to be applied to the bearing mount when inserting it into an aperture and also when inserting the bearing into the mount.

While we have demonstrated the use of our bearing mount by positioning the bearing adjacent the lands in the preferred embodiment, the assembly of bearing and shaft could be reversed. In particular, the lands could be positioned on the shaft, however, because of the geometry of the lands, it is desirable that the adjacent surface have a very smooth finish; or, an abrasive condition between the lands and the mating surface may develop and the required fit between the outer ring of the bearing and the housing may be lost.

By proper selection of materials for the bearing mounts, several additional advantages may be achieved. One such advantage is the reduction in noise level which is transferred from bearing to frame. Also vibration and shock forces which are normally transmitted from the shaft to the housing are reduced.

An integral bearing mount has been described having an external flange 22 for locating the mount in a side frame, the flange connected to a tubular member 20 which locates and retains the bearing. The surface of tubular members 20 adjacent the bearing has a plurality of equally and angularly spaced lands 24 to control the radial force applied to hold the bearing. An internal flange 26 is provided to axially locate and support the bearing about the internal lands 24 of the mount.

We claim:
1. A bearing mount comprising:
   a supporting member having an aperture therein,
   a shaft positionable within said aperture,
   an internal bearing race surrounding said shaft,
   a metallic external bearing race surrounding said internal bearing race and operatively coupled thereto allowing relative movement therebetween,
   a continuous tubular member having low coefficient of friction and positionable within the aperture in said supporting member, and operable to receive said metallic external bearing race to insulate said metallic external bearing race and supporting member,
   an externally extending rim at one end of said continuous member, the circumference of said rim being greater than the circumscribing circumference of said aperture in said supporting member, said rim positionable along one side thereof in operative contact with said supporting member,
   an internally extending rim at the other end of said continuous member, said internally extending rim having an aperture of a diameter greater than the diameter of said internal bearing race,
   said internally extending rim and said externally extending rim operable to oppose in one direction relative axial movement between said metallic external bearing member and said supporting member, and
   a plurality of displaceable resilient lands equally and angularly spaced and extending axially along the inside surface of said continuous tubular member in contact with said metallic external bearing race, the periphery of said lands defining a right circular plane concentric with the aperture in said supporting member and exerting a compressive radial force on the outside surface of said metallic external bearing race.

References Cited

UNITED STATES PATENTS

| 3,107,946 | 10/1963 | Drake | 308—26 |
| 2,324,676 | 7/1943 | Butterfield | 308—236 XR |
| 2,620,243 | 12/1952 | Beatty | 308—236 |
| 2,992,868 | 7/1961 | Vacha | 308—236 |

FOREIGN PATENTS

| 168,666 | 9/1921 | Great Britain. |
| 637,888 | 5/1950 | Great Britain. |
| 712,677 | 7/1931 | France. |

FRED C. MATTERN Jr., Primary Examiner